United States Patent
Benedek et al.

[11] Patent Number: 6,027,649
[45] Date of Patent: Feb. 22, 2000

[54] PROCESS FOR PURIFYING WATER USING FINE FLOC AND MICROFILTRATION IN A SINGLE TANK REACTOR

[75] Inventors: Andrew Benedek, Toronto; Hadi Husain, Brampton; Manwinder Singh, Burlington, all of Canada

[73] Assignee: Zenon Environmental, Inc., Burlington, Canada

[21] Appl. No.: 08/944,082

[22] Filed: Oct. 4, 1997

Related U.S. Application Data

[60] Provisional application No. 60/043,808, Apr. 14, 1997.

[51] Int. Cl.[7] ............................... B01D 15/00; C02F 1/00
[52] U.S. Cl. ..................... 210/639; 210/651; 210/660; 210/663; 210/723; 210/321.78
[58] Field of Search .................... 210/660, 663, 210/321.8, 321.78, 321.89, 651, 639, 723, 636, 758, 760

[56] References Cited

U.S. PATENT DOCUMENTS

| | | | |
|---|---|---|---|
| 3,763,040 | 10/1973 | Timpe et al. | |
| 4,028,238 | 6/1977 | Allan | 210/53 |
| 4,171,342 | 10/1979 | Hirko et al. | 423/160 |
| 4,390,431 | 6/1983 | Amigues et al. | 210/724 |
| 4,676,908 | 6/1987 | Ciepiela et al. | |
| 4,698,163 | 10/1987 | Zibrida | 210/713 |
| 4,895,665 | 1/1990 | Colelli et al. | 210/710 |
| 4,897,191 | 1/1990 | Langerak et al. | 210/321.81 |
| 5,008,017 | 4/1991 | Kiehl et al. | 210/710 |
| 5,130,051 | 7/1992 | Falk | 252/315.5 |
| 5,182,019 | 1/1993 | Cote et al. | 210/321.8 |
| 5,248,424 | 9/1993 | Cote et al. | 210/636 |
| 5,266,210 | 11/1993 | McLaughlin | 210/710 |
| 5,378,366 | 1/1995 | Yen | 210/667 |
| 5,427,691 | 6/1995 | Kuyucak et al. | 210/713 |
| 5,480,537 | 1/1996 | Yamasaki et al. | 210/96.1 |
| 5,484,535 | 1/1996 | Downs | 210/724 |
| 5,500,131 | 3/1996 | Metz | 210/705 |
| 5,518,633 | 5/1996 | Brown et al. | 210/713 |
| 5,562,829 | 10/1996 | Malcolm et al. | 210/667 |
| 5,609,765 | 3/1997 | Bowman | 210/638 |
| 5,611,934 | 3/1997 | Shepperd, III et al. | 210/719 |
| 5,614,102 | 3/1997 | Sakurada | 210/718 |
| 5,639,373 | 6/1997 | Mahendran et al. | 210/636 |

FOREIGN PATENT DOCUMENTS

| | | |
|---|---|---|
| 700963 | 1/1995 | Japan . |
| 760248 | 3/1995 | Japan . |

OTHER PUBLICATIONS

Dempsey, Brian A., Effects of Charge and Coagulant Dose on NOM Removal and Membrane Fouling Mechanisms, 2 pages.

*Primary Examiner*—W. L. Walker
*Assistant Examiner*—Michael Fleming
*Attorney, Agent, or Firm*—Andrew Alexander

[57] ABSTRACT

A system of purifying water to remove at least one of natural organic matter, color, turbidity, bacteria, cysts and oocysts, viruses, arsenic compounds and insoluble impurities. The system comprises the steps of providing a body of water to be purified; controlling the pH of the body in a range of 5 to 8; and adding a coagulant to the body to provide a floc. The floc is maintained in the body in a concentration in the range of 1 to 6, for purposes of adsorbing at least one of the natural organic matter, color, turbidity and bacteria to provide treated water. Thereafter, a first portion of the treated water and floc is removed from the body of water. A submerged semi-permeable membrane is provided in the body of water for removing a second portion of the treated water. The membrane has a pore size in the range of 0.02 to 1 $\mu$m to provide a permeate comprised of purified water and to provide a retentate containing the floc. The body of water is treated with a mixing means to minimize membrane fouling and to provide thorough mixing of the floc in the body of water.

26 Claims, 1 Drawing Sheet

PROCESS FOR PURIFYING WATER USING FINE FLOC AND MICROFILTRATION IN A SINGLE TANK REACTOR

CROSS REFERENCE TO RELATED APPLICATION

This application claims the benefit of U.S. Provisional Application Ser. No. 60/043,808, filed Apr. 14, 1997.

BACKGROUND OF THE INVENTION

This invention relates to water purification and more specifically, the invention relates to purifying water containing contaminants such as natural organic matter, bacteria, color, turbidity and insoluble impurities to provide potable water.

Drinking water sources high in natural organic matter, bacteria, color, turbidity and insoluble impurities are often treated with coagulants to form a settable floc which is removable by sedimentation. The insoluble particles are often removed by sand or multi-media filtration to remove fines. However, these systems do not provide adequate removal of cysts such as Giardia and oocysts such as crystosporidium. Further, these systems are often inadequate in achieving sufficient removal of organics to meet increasingly stringent requirements of disinfection by-products (DBP), resulting from the reaction of organic matter with chlorine disinfectant. Further, the resulting reaction products can be toxic.

Nanofiltration has been used to reduce organic materials to concentrations which results in acceptable DBP levels. While this can remove most of the offending microorganisms, the process is complex and expensive.

A number of microfiltration and ultrafiltration systems have been used on a commercial scale to remove low levels of turbidity, cysts, oocysts and bacteria in potable water. However, none of these systems are capable of processing waters with high levels of turbidity, color, organic matter or virus. If microfiltration is used, water must be post-treated with nanofiltration to remove color and organics. These process configurations, with either pre- or post-treatment, in conjunction with microfiltration and ultrafiltration, result in expensive systems which are difficult to operate. When coagulants are used, the concentration of solids in the concentrate must be kept low (up to 300 ppm), because higher concentrations either plug the membrane or result in a significant loss of operating time because of frequent backwash requirements with a resultant loss in operating capacity.

In an article by Fu and Dempsey entitled "Effects of Charge and Coagulant Dose on NOM Removal and Membrane Fouling Mechanisms" (pp. 1043–1058), presented at the American Water Works Association, Membrane Technology Conference Proceedings, February 23–26, 1997, New Orleans, La., the effect of addition of calcium to water containing natural organic matter on membrane flux was studied. It was determined that flux through membrane dropped as the level of calcium increased. Thus, when calcium dosage was increased from 0 to 50 mg/l, a 55% reduction in membrane flux was observed. This was attributed to the deposition of calcium and hydrophobic organic compounds on the membrane surface thereby blocking off the pores.

Different processes have been proposed for treating waste waters. For example, U.S. Pat. No. 5,480,537 discloses an apparatus for waste water treatment, wherein fluorine contained in waste water is converted into a fluoride through a chemical reaction. Sludge containing the fluoride is thickened and dehydrated into a sludge cake. The apparatus has first and second tanks each packed with calcium carbonate mineral. In the first tank, waste water containing fluorine is agitated by air discharged from an air diffuser and caused to react with calcium carbonate mineral.

U.S. Pat. No. 4,390,431 discloses a process for treating an aqueous phase obtained by acidic or basic washing of a hydrocarbon phase comprising a soluble aluminum compound in solution. The process is characterized in that it is neutralized at a pH of from 6 to 8.5, treated with an additive selected from the alkaline-earth metal oxides, hydroxides and carbonates, at a temperature ranging from 90° C. to the boiling point, the molar ratio of the additive to aluminum being from 1/10 to 10/1, and separated thereafter from the insoluble phase of precipitate.

Japanese Patent Application 9500963 discloses that before the ultraprocessing of the electrodialysis treatment and the reverse osmosis membrane treatment is administered to the preceding untreated water, the untreated water, flocculant and the pH adjustment agent are drawn to separation equipment. The coagulation of the water to be treated is done in the separation tank. The pretreatment method in this ultraprocessing is characterized by activated carbon adsorption and water softening treatment which are administered to the filtered water. During the immersion, aspiration filters the water with the membrane separation equipment.

Japanese Patent JP 7060248 discloses that the turbidity particles in the raw water are coagulated with aluminium salt solution. This is done in the reverse osmosis membrane facility. The resulting water is filtered by prefiltration prior to the reverse osmosis membrane facility using a precision filtration membrane. According to this reference, it is possible to filter out unwanted chemicals including iron, magnesium, organic matter or the like with the precision filtration membrane and plugging of the filtration membrane never occurs. High filtration accuracy can be obtained, extending the lifetime of the reverse osmosis membrane in the reverse osmosis facility.

In spite of these processes, there is a great need for an economical process for purifying water which will effectively remove constituents such as natural organic matter, bacteria, color, turbidity, cysts and oocysts, viruses, arsenic compounds and insoluble impurities to a very low level to provide potable water. The subject invention provides such a process.

SUMMARY OF THE INVENTION

It is an object of this invention to provide a process for purifying water to provide potable water.

It is another object of this invention to provide a process for purifying water to remove natural organic matter, color, turbidity, cysts and oocysts, bacteria, viruses and insoluble impurities.

Still, it is another object of this invention to provide a process capable of removing natural organic matter, color, turbidity, cysts and oocysts, bacteria, viruses and insoluble impurities utilizing a coagulant in combination with a semi-permeable membrane.

Yet, it is another object of this invention to provide potable water using a coagulant and semi-permeable membrane to remove impurities such as organic matter, color, turbidity, bacteria and insoluble impurities.

And yet, it is another object of the invention to effect removal of natural organic matter, color, turbidity, cysts and oocysts, bacteria, viruses and insoluble impurities using reduced levels of coagulant.

These and other objects will become apparent from a reading of the specification and claims appended hereto.

In accordance with these objects, there is provided a method of purifying water to remove at least one of natural organic matter, color, turbidity, cysts and oocysts, bacteria, viruses and insoluble impurities. The method comprises the steps of providing a body of water to be purified; adding a coagulant to the body and adding a chemical to adjust the pH between 5 and 8 and preferably between 5 and 6 to provide a floc. The coagulant and pH adjusting chemical are directly added to untreated water in a separation tank containing a submerged ultrafiltration or microfiltration membrane. The water is vigorously mixed with air or mechanical means to minimize membrane fouling and to form a very fine floc having a large surface area for effectively adsorbing natural organic matter and viruses. A high solids concentration, e.g., 1 to 6%, preferably 3 to 5%, is maintained in the separation tank to further increase such surface area for increased effectiveness. The membrane preferably has a pore size in the range of 0.02 to 1 microns, and typically in the range of 0.05 to 0.3 microns to filter out contaminants such as cysts, oocysts, bacteria and insoluble impurities. Purified water is withdrawn through the membrane and the contaminants are rejected.

In another aspect of this method, it has been discovered that a calcium compound, such as calcium chloride added to the separation tank further enhances the efficiency of removal of natural organic matter and can improve flux or permeability through the membrane. Powdered activated carbon may be added directly to the tank to adsorb smaller molecular weight organics and to remove other chemicals such as pesticides.

BRIEF DESCRIPTION OF THE DRAWING

The sole FIGURE shows a reaction tank having a semipermeable membrane submerged therein for purifying impure water to provide potable water which is removed as permeate.

DETAILED DESCRIPTION OF THE PREFERRED EMBODIMENTS

Figure 1:
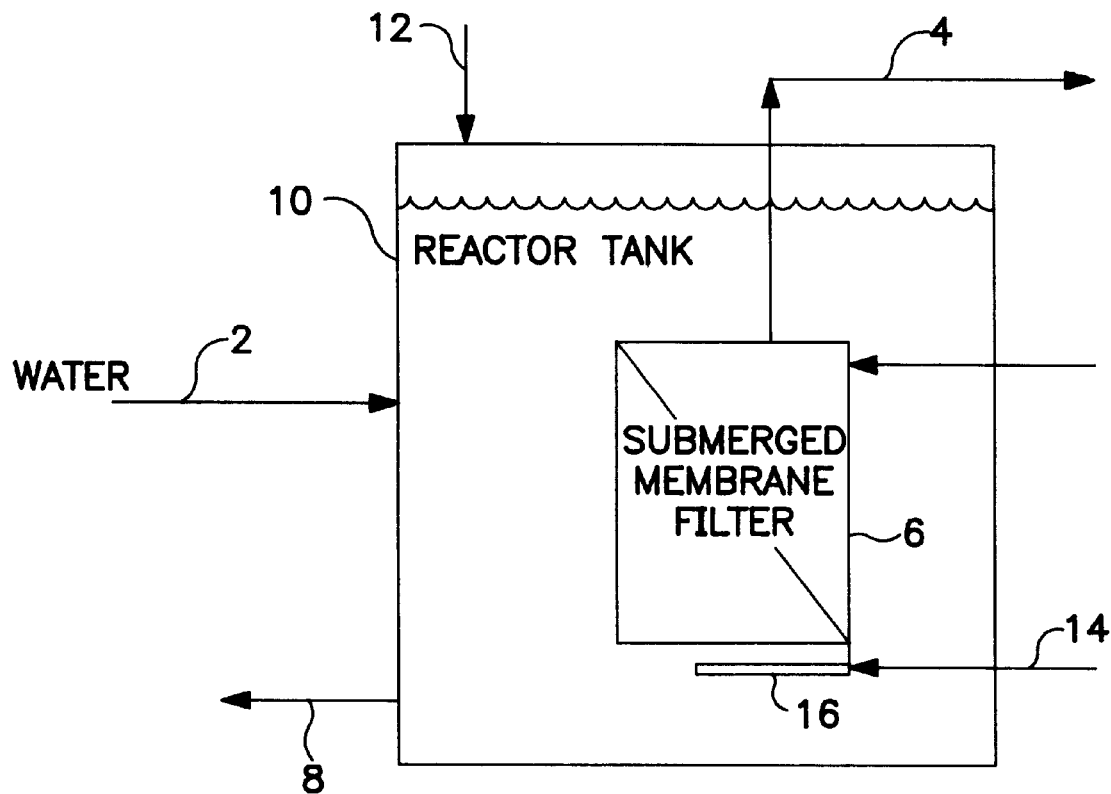

In the process of the present invention, impure water is introduced to reaction tank 10 along line 2. Purified water or permeate is removed along line 4. The impure water is treated with a coagulant which is preferably added to tank 10 along line 12. An acid or alkali may be added to tank 10 to maintain the pH at an optimum level. A portion of the untreated water along with excess floc is withdrawn from reaction tank 10 along line 8. Air is introduced along line 14 to air bubbler 16 for purposes of thoroughly mixing floc in the water contained in tank 10 and for purposes of thoroughly mixing chemicals therein. The mixing aids in maintaining a fine floc therein through mechanical attrition. Further, the air introduced along line 14 contacts membrane 6 for membrane cleaning purposes. The process is preferably operated on a continuous basis wherein impure water, coagulant and pH control chemicals are added on a continuous basis and permeate comprised of purified water is withdrawn on a continuous basis. Impure water containing excess floc may be withdrawn periodically or on a continuous basis along line 8 to maintain the requisite concentration of floc in the tank.

The type of water which can be suitably treated in the process of the present invention includes water containing natural organic matter, color, turbidity, cysts and oocysts, bacteria, viruses, arsenic compounds and soluble impurities such as pesticides and herbicides, iron and manganese. The levels of these constituents can vary depending on the water source used. Thus, the present invention is suitable for purifying many different sources of water to provide potable water.

In the present invention, the water to be treated may be subject to prior filtration (not shown) to remove solids and debris which would interfere with removal or treatment in tank 10 for removing the natural organic matter, color, turbidity, cysts, oocysts, bacteria and insoluble impurities.

In the present invention, the water to be purified is maintained at a pH in the range of 5 to 9 and typically at a pH range of 5.5 to 8. The pH should be optimum for the coagulant used. For example, the preferred pH range for ferric chloride is 5.5 to 6. If the pH is more acidic than these ranges, the pH range may be achieved with the addition of a base such as sodium hydroxide, potassium hydroxide or calcium hydroxide, with calcium hydroxide being preferred, as explained herein. If the pH is too basic, an acid such as hydrochloric or sulfuric acid may be added.

In addition, typically the temperature of the impure water is maintained at ambient temperature.

The impure water in tank 10 is then treated or conditioned by the addition of a coagulant which is preferably added directly to tank 10. Any coagulant may be used which precipitates colloidal impurities such as natural organic matter, turbidity, color causing compounds, metals, and compounds such as arsenates. The resulting floc formed offers a highly active surface area for the adsorption of soluble matter and other fine particulate matter, such as smaller organic molecules and viruses. Thus, the process of coagulation produces floc particles that can be easily filtered by a microfiltration or ultrafiltration membrane, for example, resulting in the purification of the impure water.

Coagulants that are useful in the present invention include any coagulants that are effective in a pH range from about 5 to 9. Typically, the best results are obtained with ferric salts, such as ferric chloride. Other salts such as aluminum salts which include aluminum chloride, aluminum sulfate, aluminum potassium sulfate, and aluminum nitrate may be used. It should be noted that combinations of these salts can be used. The present invention can be operated free of flocculation aids such as polyelectrolytes because it has been discovered that small floc size improves effectiveness.

Contaminated water to be treated in accordance with the invention can be treated with 5 to 200 mg/l of coagulant using either ferric salt or aluminum salt.

Two mechanisms are important in the purification of water through the addition of a coagulant. The larger molecules (10,000 to 100,000 Daltons) of natural organic matter and colloidal particulate matter are precipitated through the neutralization of surface charges measured as Zeta potential by the opposing charge on the coagulant particles. The smaller natural organic matter molecules (500 to 10,000 Daltons) and other fine organic molecules are adsorbed on the surface of the floc and are removed through ultrafiltration or microfiltration in the submerged membrane. Other non-charged particles, such as viruses, are also adsorbed or trapped in the floc particles and are retained by the membrane.

In the present invention, the concentration of floc maintained in the water in tank 10 is important to ensure high levels of removal of contaminants, particularly the natural organic matter. Thus, the concentration of floc maintained in tank 10 can range from 2 to 6 g/l with a preferred concentration being about 3 to 4 g/l. The ranges provided in this disclosure include all numbers within the range as if specifically set forth.

An important aspect of the present invention is that the floc is maintained in a fine particle size range of 0.2 to 10 microns, with a large portion of it being in the 0.5 to 5 micron range. This is obtained through mechanical attrition caused by agitation of tank 10 with air or mechanical means. The increase in surface area over the conventional coagulation-flocculation-sedimentation process is in the order of at least one magnitude. In the conventional process, large floc particles are formed through the addition of flocculation aids and gentle mixing to allow settling. The conventional process results in relatively small floc surface area, despite the fact that the sludge concentration in a sludge blanket clarifier can be high. The large particle size floc of the conventional system results in lower adsorption capacity for small organic molecules compared with the fine floc of the subject invention.

A high concentration of fine floc has the advantage that it results in a substantial reduction in the use of coagulant required. A coagulant reduction of up to 50% is possible through the use of the disclosed process. This is an important feature because it saves on operating costs and reduces the sludge produced for disposal. Thus, the disclosed process offers both cost and environmental benefits.

In another aspect of the invention, it has been discovered that calcium additions to the water in tank 10 improve natural organic matter removal. However, while calcium is effective in aiding natural organic matter removal, calcium can have the effect of decreasing flux through the semi-permeable membrane. That is, the calcium can become adsorbed on the membrane surface restricting flow, as noted earlier in the article entitled "Effects of Charge and Coagulant Dose on NOM Removal and Membrane Fouling Mechanisms". However, it has been discovered that by maintaining high floc levels in accordance with the invention, calcium can be used or added with the coagulants without detrimentally affecting the flux rate of the membrane. It has been discovered that the use of calcium with coagulants facilitates precipitation of natural organic matter by forming calcium salts of organic acids. It is believed that the use of calcium makes the organic particles more hydrophobic and therefore more adsorbable on the surface of the floc. Further, it has been discovered that fouling of the membrane by calcium is greatly minimized by maintaining the high levels of floc, as noted earlier. That is, the high levels of floc operate to quickly adsorb the calcium compounds, minimizing the deposition on the semi-permeable membrane. Calcium may be added as a soluble salt of calcium in the form of calcium hydroxide, calcium chloride, calcium sulphate and calcium carbonate. The calcium is added to tank 10 to maintain 25 to 100 mg calcium per liter of water in tank 10. Preferably, calcium is maintained in the range of 40 to 60 mg calcium per liter of water.

In another aspect of the invention, it has been discovered that metallic impurities such as iron, manganese and arsenic compounds can be removed from water in tank 10 concurrently with natural organic material, color, turbidity, bacteria, etc. That is, an oxidant such as a source of oxygen can be added to the water in tank 10 to remove metallic impurities. The oxidant reacts with the dissolved metals or compounds to form the metal oxide which is readily removed or separated by membrane filtration. Any oxidant can be employed which reacts with the metallic impurity. For example, air can be used or other oxidants such as potassium permanganate can be used. For purposes of oxidation, the oxidant, e.g., potassium permanganate, may be maintained in the water in the range of 0.1 to 20 mg/l.

While the pH of the water in tank 10 can be maintained in the range of 5 to 9 as noted above, it has been discovered that coagulation efficiency can be improved significantly at lower pH values. That is, at a pH in the range of 5 to 7 and preferably at a pH in the range of 5.5 to 6 for ferric chloride, the coagulation efficiency can be improved remarkably. At these lower pH values, it has been discovered that natural organic matter removal can be increased by up to 65%. Further, the amount of coagulant required can be decreased by up to 60%. While the inventors do not wish to be bound by any theory of invention, it is believed that changing pH affects both the coagulating species as well as protonation of the natural organic matter. That is, it is believed that the coagulating species are more positively charged at low pH, and thus, at low pH both adsorption and charge neutralization is enhanced. Cost of maintaining the low pH is more than offset by the reduced total chemical costs. Further, lower pH has the advantage of improved flux for the membrane.

As noted above, with lower molecular weight natural organic compounds, adsorption is the dominant process for removing natural organic matter from the water in tank 10. Thus, it has been found that the addition of an adsorbent operates to efficiently remove or adsorb lower molecular weight natural organic matter from the water in tank 10. The preferred adsorbent is activated carbon. However, any suitable adsorbent such as alumina particles, activated alumina, clays or activated clays can be used to remove the low molecular weight natural organic matter from the water. For purposes of the invention, adsorbent such as activated carbon should be added to provide 5 to 50 grams activated carbon per liter of water with a preferred amount being 10 to 25 grams activated carbon per liter of water. The addition of adsorbent in tank 10 containing the separation of microfiltration membrane has the advantage of removing low molecular weight natural organic matter before it can foul the membrane. Thus, the in-situ use of activated carbon has the advantage that it effectively removes low molecular weight natural organic compounds and improves flux through the membrane. The alumina particles, e.g., activated alumina particles (size 1 to 20 $\mu$m, preferably 1–5 $\mu$m) or clays have the additional benefit of improving or maintaining flux through the membrane by providing a cleaning action to the membrane. Further, the aluminum particles are useful for adsorbing and removing arsenic compounds.

The present invention provides for the chemical treatments and ultra or microfiltration to occur in a single vessel as shown in the FIGURE. Thus, all the steps of coagulation, flocculation and filtration occur in a single unit or vessel. While any microfiltration module 6 may be used, it has been found highly advantageous to use a submerged microfiltration module 6, as described and claimed in U.S. Pat. No. 5,248,424, incorporated herein by reference as specifically set forth. The membrane is comprised of an array of hollow fibers. That is, the membrane is comprised of a frameless array of unconfined hollow fibers which provide an effective membrane device for withdrawing permeate from water containing high levels of floc, the flux through the membranes reaching an essentially constant relatively high value because of the deployment of fibers of the array as a skein, arching in a buoyantly swayable generally parabolic configuration. The array extends above at least one of the array's headers in which the terminal end portions of the fibers are potted. The length of each hollow fiber is normally greater than the direct center-to-center distance between the array's pair of headers. For use in a reactor such as tank 10, an assembly of the array and a gas distributor means has fibers preferable >0.5 meter long, which together provide a surface area >10 m². The terminal end portions of fibers in each header are substantially free from fiber-to-fiber contact. When used in a tank from which the permeate is withdrawn at a location low enough to overcome the trans-membrane pressure differential of the fibers, the permeate is withdrawn under a vacuum induced by gravity. To increase flux, a pump may be used which provides a suction less than 75 cm of Hg. When used in combination with a gas-distribution manifold disposed beneath the skein so as to flow bubbles through or between the hollow fibers, the surfaces of the fibers are surprisingly resistant to being fouled by build-up of deposits of floc or sedimentations. Membranes with high transmembrane pressure differential are best suited to permeate being removed with a vacuum pump.

As disclosed in U.S. Pat. No. 5,248,424, the hollow fibers used to form the skein of an array may be formed of any membrane material provided the fibers are flexible. Preferred fibers operate with a transmembrane pressure differential in the range from about 3.5 kPa (0.5 psi) to about 175 kPa (25 psi). Most preferred are hollow fibers which provide a transmembrane pressure differential in the range from 7 kPa (1 psi) to 69 kPa (10 psi).

Preferred hollow fibers are made of organic polymers and ceramics, whether isotropic, or anisotropic, with a thin layer or skin on the outside surface of the fibers. Some fibers may be made from braided cotton covered with a porous natural rubber latex or a water-insoluble cellulosic polymeric material. Preferred organic polymers for fibers are polysulfones, poly(styrenes), including styrene-containing copolymers such as acrylonitrile-styrene, butadiene-styrene and styrene-vinylbenzylhalide copolymers, polycarbonates, cellulosic polymers, polypropylene, poly(vinyl chloride), poly (ethylene terephthalate), and the like disclosed in U.S. Pat. No. 4,230,463 the disclosure of which is incorporated by reference thereto as if fully set forth herein. Preferred ceramic fibers are made from alumina by E.I. duPont deNemours Co. and disclosed in U.S. Pat. No. 4,069,157.

In the array, the fibers are deployed in the substrate to form an unsupported arch or loop, the dimensions of the arch or loop being determined by the length of the skein and the spacing of the headers. Though, the generally parabolic arch formed is usually symmetrical because the headers are coplanarly disposed within the substrate, the shape of the arch may also be asymmetrical. The arch is asymmetrical when one header is disposed at a lower level, transversely spaced-apart from the other.

For hollow fiber membranes, the outside diameter of a fiber is at least 20 µm and may be as large as about 3 mm, typically being in the range from about 0.1 mm to 2 mm. The larger the outside diameter the less desirable the ratio of surface area per unit volume of fiber. The wall thickness of a fiber is at least 5 µm and may be as much as 1.2 mm, typically being in the range from about 15% to about 60% of the outside diameter of the fiber, most preferably from 0.5 mm to 1.2 mm.

The average pore cross-sectional diameter in a fiber may vary widely, being in the range from about 5 to 10,000 Å. The preferred pore diameter for ultrafiltration of components is a substrate feedstream being in the range from about 5 to 1,000 Å; and for microfiltration, in the range from 1,000 to 10,000 Å.

Unlike in a conventional module, the length of a fiber in a skein is essentially independent of the strength of the fiber, or its diameter, because the skein is buoyed, both by bubbles and the substrate in which it is deployed. The length of each fiber in the skein is preferably determined by the conditions under which the array is to operate. Typically, fibers range from 1 m to about 5 m long, depending upon the dimensions of the body of substrate (depth and width) in which the array is deployed.

The number of fibers in an array is arbitrary, typically being in the range from about 1,000 to about 10,000, and the preferred surface area for a skein is in the range from 10 m² to 100 m².

Air may be provided continuously or intermittently, better results generally being obtained with continuous air flow. The amount of air provided depends upon the type of substrate and the susceptibility of the surfaces of the fibers to be plugged. Air may be provided to tank 10 continuously and typically added continuously at a rate of 0.005 to 0.5 ft³/min/ft² of membrane surface. If the air is added intermittently, the same rates can apply and the interval may be 1 to 30 minutes.

Another membrane module employing hollow fiber membranes suitable for use in the present invention is disclosed in U.S. Pat. No. 5,639,373, incorporated herein by reference as if specifically set forth. Exemplary of a substantially vertical membrane is shown in FIG. 3 of U.S. Pat. No. 5,639,373.

The vertical skein is located in the water to present a generally vertical profile, but has no structural shape. Such shape changes continuously, the degree of change depending upon the flexibility of the fibers, their lengths, the overall dimensions of the skein, and the degree of movement imparted to the fibers by the water and also by the oxygen-containing gas from the gas-distribution means.

A submerged planar semi-permeable membrane module may also be used in accordance with the invention.

It will be appreciated that U.S. Pat. Nos. 5,248,424 and 5,639,373 depict configurations of membranes which can be used, and other configurations are contemplated within the purview of the invention. For example, while the skeins of fibers are shown vertical, it will be appreciated that the skeins may be disposed in a horizontal configuration or at any angle between horizontal and vertical, as desired.

While mixing in tank 10 is achieved with air, it will be appreciated that other mixing means may be employed including mechanical, hydraulic and ultrasonic mixing means. It should be noted that conventional systems rely on quiescence and sedimentation for purposes of settling and separation. By comparison, the present invention requires thorough mixing of the water and floc for purposes of improved separations and removal of natural organic matter, bacteria, color, turbidity and insoluble impurities. Thus, this invention avoids the need or use of a settleable floc.

Further, when the system is operated on a continuous basis, the flow rates to and from tank 10 should be adjusted to provide an average or hydraulic retention time in the range of 10 to 60 minutes.

After the impure water is treated in accordance with the invention, the water may then be subjected to electrodialysis or reverse osmosis to provide high purity water.

The following examples are still further exemplary of the invention.

EXAMPLE 1

This example was performed using a single tank reactor incorporating therein a submerged semi-permeable membrane as shown in the FIGURE. A hollow fiber semipermeable membrane module was used. Untreated water was added to the reactor tank having a TOC (total organic carbon) of 4.2 mg/l, an alkalinity measured as $CaCO_3$ of 9 mg/l and a color level of 33 TCU. Ferric chloride was added to the reactor tank to provide a concentration of 40 gms/l. The pH of the water was maintained at about 6. The vacuum applied to the hollow fibers was maintained at about 15 inches of mercury to withdraw permeate or purified water therethrough. The water in reaction tank was operated at three different concentrations of floc, namely, 0.568, 0.94 and 3.5 g/l, respectively. The permeate or purified water was measured for total organic carbon (TOC) and found to be 1.8, 1.5 and 0.96 mg/l corresponding to the concentrations of floc corresponding to the concentrations of floc, respectively. The efficiency of the single tank coagulation-microfiltration system to remove natural organic matter increased with increasing concentration of floc in reactor tank. By comparison, when the same feed water was treated in a conventional process involving coagulation, flocculation, sedimentation as follows: final filtration in a 0.2 micron filter, implemented in a jar test apparatus, with a rapid mix at 100 rpm for two minutes, slow mix at 30 rpm for 30 minutes, followed by settling and microfiltration, the natural organic matter, measured as TOC, was only reduced to a level of 3.2 mg/l.

EXAMPLE 2

This example was the same as Example 1, except a different source of impure or untreated water was used. The water had a TOC of 3.6 mg/l, an alkalinity level of 175 mg/l and a color level of 18 TCU. Ferric chloride was added to provide a concentration of 40 mg/l. The pH of the water was maintained at about 7. The concentration of floc was maintained at 3.5 g/l. Water removed as permeate or purified water had a TOC of 1.5 mg/l. The same water subjected to the conventional treatment as in Example 1 had a TOC of 2.2 mg/l. Thus, it will be seen that the water treated in accordance with the invention had a marked improvement on the level of purity.

EXAMPLE 3

This example was the same as Example 1, except the untreated water had a TOC of 33 mg/l, an alkalinity of 170 mg/l (as $CaCO_3$) and a color level of 127 TCU. Ferric chloride was added to provide a concentration of 100 mg/l. The concentration of floc was maintained at 3.5 g/l and the pH was maintained at 6.9. The water treated in accordance with the invention had a TOC of 5.2 mg/l and water treated by the conventional treatment as described in Example 1 had a TOC of 5.7 mg/l.

EXAMPLE 4

This example was the same as Example 1, except the untreated water had a TOC of 4.2 mg/l, an alkalinity of 9 mg/l (as $CaCO_3$) and a color level of 33 TCU. Ferric chloride was added to provide a concentration of 40 mg/l and pH was maintained at about 6. Calcium chloride and activated carbon were added to the reaction tank at different stages. It was found that the conventional treatment resulted in a TOC of 2.2 mg/l. After calcium was added as calcium chloride to a level of 50 mg/l, the TOC level was 2.3 mg/l. When water was treated in accordance with the invention, the TOC was 0.94 mg/l (before addition of calcium), and after calcium was added, the TOC dropped to 0.77 mg/l. Activated carbon was added after the calcium addition to provide 15 mg/l activated carbon and the TOC dropped to 0.32 mg/l. This example shows that both the addition of calcium and activated carbon resulted in an unexpected reduction in the TOC level of the permeate water.

EXAMPLE 5

This example was the same as Example 1, except the untreated water had a TOC of 7.8 mg/l, an alkalinity of 67 mg/l (as $CaCO_3$). Ferric chloride was added to provide a concentration of 40 mg/l and pH was maintained in the range of 5.3 to 5.8. Calcium was added (as $CaCl_2$) to provide a concentration of 50 mg/l. The permeate water had a TOC of 1.8 mg/l.

Conducted tests were conducted by taking 1 liter of untreated water in 4 jars. All the jars contained 50 mg/g of calcium added as $CaCl_2$. After adding desired quantity (shown below) of ferric chloride, the pH was adjusted to 5.5 The jars were rapidly mixed at 100 rpm for 2 minutes followed by slow mixing at 30 rpm for 30 minutes. Finally, the solution was filtered using 0.2 micron filter and the filtrate was tested for TOC analysis. The results were as follows:

| $FeCl_3$ Dose (mg/l) | Ca Dose (mg/l) | TOC |
|---|---|---|
| 40 | 50 | 4.9 |
| 50 | 50 | 4.4 |
| 60 | 50 | 3.3 |
| 70 | 50 | 2.9 |

This shows that compared to conventional processes, significant savings in coagulant costs can be achieved in single tank coagulation processes. The present invention provided superior removal of TOC than these conventional tests even when higher concentrations were used.

EXAMPLE 6

This example showed the effect of calcium addition on flux. Water of total TOC content of 7.8 mg/l and alkalinity of 56 was treated in a reactor with a floc concentration of 3.5 mg/l. A ferric chloride dosage of 40 m/l was added to the tank, and purified water was removed under a vacuum of 15 in Hg through a microfilter with a pore diameter of 0.12 microns. After one hour of operation, the permeability stabilized at 10 gfd/psi.

The system was then operated with the above conditions and 50 mg/l of Ca as $CaCl_2$ was added. The flux stabilized after one hour, and permeability was determined to be 14.9 gfd/psi. It will be seen that adding calcium to the high concentration of a fine floc had a pronounced effect. That is, the permeability actually increased as a result of adding calcium to provide a substantial improvement in permeability.

It will be seen from these examples that impure water treated in accordance with the invention has substantially lower levels of total organic carbon when compared to the same water treated conventionally.

While the invention has been described in terms of preferred embodiments, the claims appended hereto are intended to encompass other embodiments which fall within the spirit of the invention.

What is claimed is:

1. A method of purifying water on a continuous basis to remove contaminants comprised of natural organic matter, color, turbidity, bacteria, cysts and oocysts, viruses, arsenic compounds and insoluble impurities, the method comprising the steps of:
(a) providing a body of water to be purified in a single tank reactor;
(b) controlling the pH of said body in a range of 5 to 8;
(c) adding a coagulant to said body of water to cause said contaminant to form a floc therein;
(d) maintaining said floc in said body in a concentration in the range of 2 to 6 gm/l and in a size range of 0.2 to 10 μm for purposes of adsorbing at least one of the contaminants thereon to provide treated water;
(e) removing a first portion of said treated water and said floc from said body of water to maintain said floc in said concentration;
(f) providing a submerged semi-permeable membrane in said body of water in said single tank reactor;
(g) removing a second portion of said treated water through a semi-permeable membrane having a pore size in the range of 0.01 to 1 μm to provide a permeate comprised of purified water; and
(h) treating said body of water with a mixing means to provide mixing of said floc in said body of water and to minimize membrane fouling, the above steps occurring in the single tank reactor.

2. The method in accordance with claim 1 including maintaining said floc in a range of 3 to 5 gm/l and said floc size in a range of 0.5 to 5 μm.

3. The method in accordance with claim 1 including maintaining said pH in a range of 5 to 7.

4. The method in accordance with claim 1 including adding a source of calcium to said body of water in an amount sufficient to improve removal of organic matter from said water.

5. The method in accordance with claim 1 including maintaining calcium in said body of water in the range of 25 to 100 mg/l of water.

6. The method in accordance with claim 1 including maintaining calcium in said body of water in the range of 40 to 60 mg/l of water.

7. The method in accordance with claim 1 including adding activated carbon to said body of water in an amount sufficient to improve removal of natural organic matter.

8. The method in accordance with claim 1 including maintaining activated carbon in said body of water in the range of 5 to 20 gm/l of water.

9. The method in accordance with claim 1 wherein said membrane is a hollow fiber membrane having a pore size in the range of 0.05 to 0.3 μm.

10. The method in accordance with claim 1 including introducing air as said mixing means.

11. The method in accordance with claim 1 including introducing an oxidant to said body of water to oxidize.

12. The method in accordance with claim 1 including the step of backwashing said membrane.

13. A method of purifying water to remove contaminants comprised of at least one of natural organic matter, color, turbidity, bacteria, cysts and oocysts, viruses and insoluble impurities on a continuous basis, the method comprising the steps of:
(a) providing a body of water to be purified in a single tank reactor;
(b) controlling the pH of said body in a range of 5 to 7;
(c) adding a coagulant to said body to provide a floc;
(d) providing a source of calcium in said body of water in a concentration in the range of 25 to 100 mg/l;
(e) maintaining said floc in said body in a concentration in the range of 2 to 6 gm/l for purposes of adsorbing at least one of the contaminants to provide treated water;
(f) removing a first portion of said treated water and said floc from said body of water to maintain said floc in said concentration;
(g) providing a submerged semi-permeable membrane comprised of hollow fibers in said body of water in said single tank reactor;
(h) removing a second portion of said treated water through a semi-permeable membrane having a pore size in the range of 0.01 to 1 μm to provide a permeate comprised of purified water; and
(I) bubbling air through said body of water to minimize membrane fouling and to provide mixing of said floc in said body of water to minimize settling of said floc all of the above steps occurring in the single tank reactor.

14. A method of purifying water to remove contaminants comprised of at least one of natural organic matter, color, turbidity, bacteria, cysts and oocysts, viruses and insoluble impurities on a continuous basis, the method comprising the steps of:
(a) providing a body of water to be purified in a single tank reactor;
(b) controlling the pH of said body in a range of 5 to 7;
(c) adding a coagulant to said body to provide a floc in a concentration range of 3 to 5 gm/l having a size range of 0.5 to 5 μm;
(d) adding at least one of a source of calcium in the range of 25 to 100 mg/l, alumina particles and activated carbon in the amount of 5 to 20 gm/l to said body of water;
(e) maintaining said floc in said body in a concentration in the range of 3 to 5 wt. %, for purposes of adsorbing at least one of natural organic matter, color and bacteria to provide treated water;
(f) removing a first portion of said treated water and said floc from said body of water to maintain said floc in said concentration;
(g) providing a submerged semi-permeable membrane comprised of hollow fibers in said body of water in said single tank reactor;
(h) removing a second portion of said treated water through a semi-permeable membrane having a pore size in the range of 0.01 to 0.3 μm to provide a permeate comprised of purified water; and
(I) bubbling air through said body of water to minimize membrane fouling and to provide thorough mixing of said floc in said body of water to minimize settling of said floc, the above steps occurring in the single tank reactor.

15. The method in accordance with claim 14 including maintaining activated carbon in said body of water in the range of 10 to 25 gm/l of water.

16. The method in accordance with claim 13 including introducing an oxidant to said body of water to oxidize.

17. A method for purifying water in a single tank reactor containing a body of impure water having submerged therein a semi-permeable membrane, said method adapted to remove contaminants comprised of at least one of natural organic matter, color, turbidity, bacteria, cysts and oocysts, viruses, arsenic compounds and insoluble impurities, the method comprising the steps of:
(a) introducing impure water to provide a body of water in said single tank reactor;

(b) adding a coagulant to said body to provide a floc therein in the range of 2 to 6 gm/l and having a size range of 0.2 to 10 μm for purposes of adsorbing contaminants thereon to provide treated water;

(c) maintaining said body in a pH range of 5 to 8;

(d) removing a portion of said treated water containing said floc from said body of water to maintain said floc in said range;

(e) providing a submerged semi-permeable membrane in said body of water;

(f) bubbling air past said membrane to improve flux through said membrane and to provide thorough stirring to minimize settling of floc in said tank; and (g) withdrawing water through said membrane on a continuous basis to provide a permeate comprised of purified water depleted in said contaminants, the above steps occurring in the single tank reactor.

18. The method in accordance with claim 17 including maintaining said floc in a range of 3 to 50 gm/l and in a size range of 0.5 to 5 μm.

19. The method in accordance with claim 17 including maintaining said pH in a range of 5 to 7.

20. The method in accordance with claim 17 including adding a source of calcium to said body of water in an amount sufficient to improve removal of organic matter from said water.

21. The method in accordance with claim 17 including maintaining calcium in said body of water in the range of 25 to 100 mg/l of water.

22. The method in accordance with claim 17 including adding activated carbon to said body of water in an amount sufficient to improve removal of organic matter.

23. The method in accordance with claim 17 including maintaining activated carbon in said body of water in the range of 5 to 20 gm/l of water.

24. The method in accordance with claim 17 including introducing an oxidant to said body of water to oxidize.

25. The method in accordance with claim 17 including introducing alumina particles to said body of water to improve removal of contaminants.

26. A method for purifying water on a continuous basis in a single tank reactor containing a body of impure water having submerged therein a semi-permeable membrane, said method adapted to remove contaminants comprised of at least one of natural organic matter, color, turbidity, bacteria, cysts and oocysts, viruses, arsenic compounds and insoluble impurities, the method comprising the steps of:

(a) introducing impure water on a continuous basis to provide a body of water in said single tank reactor;

(b) adding a coagulant to said body to provide a floc therein in the range of 3 to 5 gm/l and in a size range of 0.5 to 5 μm for purposes of removing contaminants to provide treated water;

(c) introducing a source of calcium, activated carbon and alumina particles to said body of water in an amount sufficient to improve removal of said contaminants;

(d) maintaining said body in a pH range of 5 to 7;

(e) removing a portion of said treated water containing said floc from said body of water to maintain said floc in said range;

(f) providing a submerged semi-permeable membrane comprised of a hollow fiber membrane in said body of water, the membrane having a pore diameter in the range of 0.01 to 1 μm;

(g) bubbling air past said membrane to improve flux through said membrane and to provide stirring to minimize settling of floc in said tank; and (h) withdrawing water through said membrane on a continuous basis to provide a permeate comprised of purified water depleted in said contaminants the above steps occurring in the single tank reactor.

* * * * *